US009924069B2

(12) United States Patent
Spiro et al.

(10) Patent No.: US 9,924,069 B2
(45) Date of Patent: Mar. 20, 2018

(54) RADIAL LENTICULAR BLENDING EFFECT

(71) Applicant: Tracer Imaging LLC, White Plains, NY (US)

(72) Inventors: Steven M. Spiro, Chappaqua, NY (US); Stephen S. Daniell, Northampton, MA (US); Daniel L. Lau, Lexington, KY (US)

(73) Assignee: TRACER IMAGING LLC, White Plains, NY (US)

( * ) Notice: Subject to any disclaimer, the term of this patent is extended or adjusted under 35 U.S.C. 154(b) by 0 days.

(21) Appl. No.: 15/409,187

(22) Filed: Jan. 18, 2017

(65) Prior Publication Data

US 2017/0201649 A1    Jul. 13, 2017

Related U.S. Application Data

(60) Continuation of application No. 14/922,894, filed on Oct. 26, 2015, now Pat. No. 9,568,649, which is a division of application No. 13/564,834, filed on Aug. 2, 2012, now Pat. No. 9,171,392.

(60) Provisional application No. 61/514,311, filed on Aug. 2, 2011.

(51) Int. Cl.
| | |
|---|---|
| *G06F 3/12* | (2006.01) |
| *H04N 1/387* | (2006.01) |
| *G02B 3/00* | (2006.01) |
| *H04N 1/393* | (2006.01) |
| *G06T 13/80* | (2011.01) |

(52) U.S. Cl.
CPC ......... *H04N 1/3871* (2013.01); *G02B 3/0006* (2013.01); *G06T 13/80* (2013.01); *H04N 1/393* (2013.01)

(58) Field of Classification Search
None
See application file for complete search history.

(56) References Cited

U.S. PATENT DOCUMENTS

| | | | | |
|---|---|---|---|---|
| 1,150,374 A | * | 8/1915 | Kanolt | G02B 3/0012 352/81 |
| 5,438,429 A | * | 8/1995 | Haeberli | G03B 35/14 358/445 |
| 6,139,066 A | * | 10/2000 | Mowry, Jr. | B41M 3/14 283/72 |
| 7,480,100 B1 | * | 1/2009 | Raymond | G02B 27/06 359/619 |
| 7,941,001 B1 | * | 5/2011 | Sahu | G06T 3/0025 345/660 |
| 9,429,762 B2 | * | 8/2016 | Holmes | G02B 27/2214 |
| 2002/0063586 A1 | | 5/2002 | Kiehl | |
| 2002/0135177 A1 | * | 9/2002 | Welch | B42C 7/002 281/31 |

(Continued)

*Primary Examiner* — Ted Barnes
(74) *Attorney, Agent, or Firm* — Leason Ellis LLP

(57) ABSTRACT

A method of integrating a radial zoom effect with a complementary radial image transition effect includes integrating the effects such that the two blended radial effects share a common center, and thereby share common displacement paths during the perceived transition. In addition to the visual appeal of the effect, the invention also resolves operational incompatibilities between the practice of commercial photography and the practice of lenticular printing. A lenticular product is formed in accordance with this method.

20 Claims, 4 Drawing Sheets

(56) References Cited

U.S. PATENT DOCUMENTS

| | | | |
|---|---|---|---|
| 2005/0063586 A1* | 3/2005 | Munsil | H04N 1/4053 382/162 |
| 2006/0017979 A1* | 1/2006 | Goggins | G02B 3/0056 358/3.24 |
| 2006/0109202 A1* | 5/2006 | Alden | H04N 13/0228 345/32 |
| 2006/0115180 A1* | 6/2006 | Adams | G03C 9/00 382/284 |
| 2006/0227427 A1* | 10/2006 | Dolgoff | G02B 3/005 359/619 |
| 2007/0111171 A1* | 5/2007 | Kane | G09B 19/00 434/156 |
| 2007/0273679 A1* | 11/2007 | Barton | A63F 13/06 345/207 |
| 2008/0118674 A1* | 5/2008 | Raymond | B29C 45/14688 428/29 |
| 2008/0204873 A1* | 8/2008 | Daniell | G02B 27/2214 359/463 |
| 2009/0056181 A1* | 3/2009 | Meyer | G03B 25/02 40/454 |
| 2009/0303603 A1* | 12/2009 | Goggins | G02B 3/0056 359/628 |
| 2010/0060939 A1* | 3/2010 | Lau | H04N 1/4052 358/3.21 |
| 2011/0181706 A1* | 7/2011 | Harrold | G02B 27/225 348/51 |
| 2012/0018390 A1* | 1/2012 | McKee | A47F 5/02 211/49.1 |
| 2012/0067238 A1* | 3/2012 | Daniell | G02B 27/2214 101/481 |
| 2012/0200916 A1* | 8/2012 | Bent-Gourley | G02B 27/2214 359/463 |
| 2014/0334665 A1* | 11/2014 | Quinn | G06T 1/0085 382/100 |

* cited by examiner

RADIAL LENTICULAR BLENDING EFFECT

CROSS REFERENCE TO RELATED APPLICATION

The present application is a continuation of U.S. patent application Ser. No. 14/922,894, filed Oct. 26, 2015, which is a divisional of U.S. patent application Ser. No. 13/564,834, filed Aug. 2, 2012, which claims priority to U.S. patent application Ser. No. 61/514,311, filed Aug. 2, 2011, which is hereby incorporated by reference in its entirety.

TECHNICAL FIELD

The invention relates to the preparation and production of images for use in conjunction with a lenticular lens array and more particularly relates to a lenticular product that is formed using a radial lenticular blending effect.

BACKGROUND

Refractive overlays can be used in various ways to produce images of variable aspect. Lenticular lens arrays are a class of refractive array that most typically includes a set of lenses of cylindrical geometry arranged in a parallel manner. A specially prepared image may be fixedly mated to a lenticular array in such a way that that the image's aspect changes with a shift in the relative positions of the observer and the lenticular image. Alternately, separately mounted imagery may be displaced relative to a suitably positioned lenticular array so that a change in aspect is made visible to a stationary observer.

The modern practice of lenticular imaging has come to encompasses diverse transitions, including shifts of color, text, scale, and content as well as autostereoscopic and animation effects.

The special preparation of the image includes the step commonly known as interlacing. Interlacing combines image information from two or more images in a finely interleaved pattern that is coordinated with the pitch of the lenses. Interlacing in this manner briefly predates the invention of lenticular imaging, as it was initially proposed in 1896 by Auguste Berthier to promote a stereoscopic effect in conjunction with a parallax barrier screen.

A mechanically activated lenticular system is described in U.S. Pat. No. 592,631 to Hollander. In Hollander, the effects are limited to geometrical and chromatic patterns and does not expressly include any interlacing step. U.S. Pat. No. 624,042 to Jacobson describes the interlacing of right and left views. U.S. Pat. No. 624,043, also to Jacobson, combines this interlaced print with a corrugated transparent sheet to produce the first record of a lenticular "Stereograph".

U.S. Pat. No. 1,150,374 to Kanolt recommends the use of many source images to produce a lenticular picture that simulates a continuous transition. The patent includes the fundamental calculations needed to properly compose such an image and locate such interposed multi-view imagery in optimal cooperation with a lenticular array.

Each of the U.S. Patents referenced herein is expressly incorporated by reference in its entirety.

Kanolt suggests various effects that may be obtained by this means, including an effect continuous motion. Kanolt also discloses that the method may equally be applied to convey temporal changes, such as an impression of growth of a plant or animal, or gradual shifts in the facial expression or facial features of a human subject.

The current core practice of preparing a lenticular image departs little in concept from Kanolt's descriptions from 1915, although the interlaced image in now principally composed using image processing software rather than earlier optomechanical methods.

Current lenticular software often includes options described by the terms 3D, flip, or zoom. A 3D image may be derived from a real scene, or synthesized from a layered image file composed in an image editing application. A lenticular image that exhibits an abrupt transition between images, whose subject matter may electively be related or unrelated, is known as a flip image. A zoom image is an image that shows a transition of text or image from one scale to another.

In the common understanding, a zoom image may be said to differ from the growth illusion described by Kanolt in that in a zoom image there is no representation of a passage of time. In a lenticular zoom image, a single source image is resampled at differing scales to ultimately draw attention to a particular area of the broader source image, much as a zoom lens would be used in videography.

Lenticular zoom images can vary in their composition or effect. For example, the zoom effect may be pervasive and continuous across the angular viewing range, or may be devised to occur only between two relatively static "zoomed out" and "zoomed in" phases. The zoom transition may be made to appear as a seamless radial blur, or may present a distinguishable set of progressively scaled versions of the source image.

SUMMARY

The present invention describes a method of integrating a radial zoom effect with a complementary radial image transition effect. The integrated effect may be agreeably devised such that the two blended radial effects share a common center, and thereby share common displacement paths during the perceived transition. In addition to the visual appeal of the effect, the invention also resolves operational incompatibilities between the practice of commercial photography and the practice of lenticular printing.

The present invention can thus employ a blending function, such as an alpha channel, which determines the degree of contribution of the second image with respect to the first image. In other words, the blending function employed in the present invention controls the degree (level) of visibility of the second image relative to the first image.

In another aspect, the present invention is directed to a lineated printed image for use in cooperation with a lenticular lens material to form a lenticular product.

BRIEF DESCRIPTION OF DRAWING FIGURES

DETAILED DESCRIPTION OF CERTAIN EMBODIMENTS

Commercial photographers are commonly called upon to take group photographs for schools, athletic teams, weddings, family reunions, conferences, company events, and other associations. In such an instance, it has been found that a lenticular zoom effect could in some cases be used to derive an appealing and readily marketable photographic product. For example, a team photo could be used as the source for a lenticular image that showed the team as a whole, and then zoomed in on a given player.

However, in the implementation of this practice, certain technical and practical limitations were encountered. First, when the group being captured exceeded a relatively small number, the area occupied by an individual within the group image was often of insufficient resolution to provide an adequate "zoomed in" image.

It may be appreciated that this reprocessing of a single still image to simulate a zoom effect differs from optical zooming in photography or videography, in which the sensor resolution is constant. It has been found that the resolution in the targeted area is further limited by the common commercial practice of including a large background margin around the group. In this way, the image may be cropped and framed without encroaching on the subject group. However this practices reduces the number of images that are amenable to a lenticular zoom effect.

Perhaps more importantly, zooming in on an individual member of the group requires that that person be identified, and the target region around the subject defined by a four sets of x, y coordinates. Both the indexing of individuals within a group photograph and the locating of the corner coordinates of the target add greatly to the usual workflow of professional photographers.

However, the workflow of a photography session commonly generates not only a group image, but images of individual or subgroups. These may be images of individual athletic players, or of branches of a family at a large reunion. Regardless, as the more specific subjects are captured separately at full sensor resolution, the images of these individuals or subgroups do not encounter the resolution barrier previously described.

Furthermore, the record keeping associating the more specific image with the more comprehensive image is a part of the existing professional photographic workflow. Therefore, while it was found that many photographers could not consistently provide the imagery and information needed to generate a conventional lenticular zoom, it was found that photographers could invariably provide a potentially adaptable pair of related but independently captured images.

Figure 2:
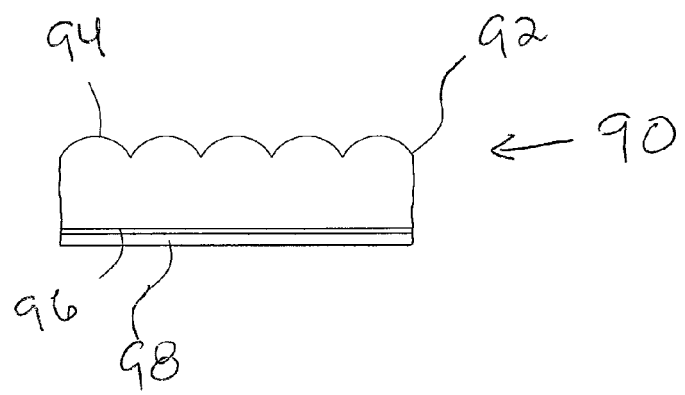
FIG. 2 is a cross-sectional view of an exemplary lenticular product made in accordance with the present invention.

FIG. 2 shows a conventional lenticular product 90. The product 90 is formed of a transparent lenticular (lens) sheet 92 that has a plurality of lenticules 94 formed thereon. The plurality of lenticules is arrayed in parallel to form a lenticulated surface having vertices and valleys. On a planar rear surface of the lenticular sheet 92, an interlaced print image layer 96 is provided. A backing layer 98 can be provided with the interlaced print image layer 96 being disposed between the backing layer 98 and the lenticular sheet 92.

In lenticular imaging, two such images would normally be combined to simply flip from one to another. However, a significant number of photographers and their retail customers found the straightforward flip wanting relative to the more dynamic zoom effect. The invention is therefore directed to the provision of an appealing radial transition in the absence of the data set required for a conventional targeted zoom.

In a practice of the present invention, two source images and an intermediate digital filter are employed in a conscientious manner. The intermediate digital filter may be represented in a visual interface by an alpha channel, but it should be appreciated that the filter may be fully integrated in an image processing application, and therefore embodied in software alone.

It should be noted that the following description is intended to make a clear description of the ultimate image structure of the integrated radial image. It should be understood that, depending upon the particular properties of the software or hardware, efficient rendering of the interlaced image formed in accordance with the invention can imply vastly different processing paths and data streams. Rendering hardware may include single or plural cores, single or plural CPUs, single or plural GPUs, and may also include local or remote servers or clusters. Software may be diversely composed and compiled. For example, processes which are described below may at the core level be executed in discrete data blocks rather as a series of fully realized images or channels.

More particularly, the present invention is part of a computer system for creating a lenticular product that has a radial lenticular blending effect as described herein. The referenced systems and methods are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods. Accordingly, aspects of the present systems and methods can take the form of an entirely hardware embodiment, an entirely software embodiment (including firmware, resident software, micro-code, etc.), or an embodiment combining software and hardware. One of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Furthermore, the terms and phrases used herein are not intended to be limiting, but rather are to provide an understandable description of the systems and methods.

Figure 1:
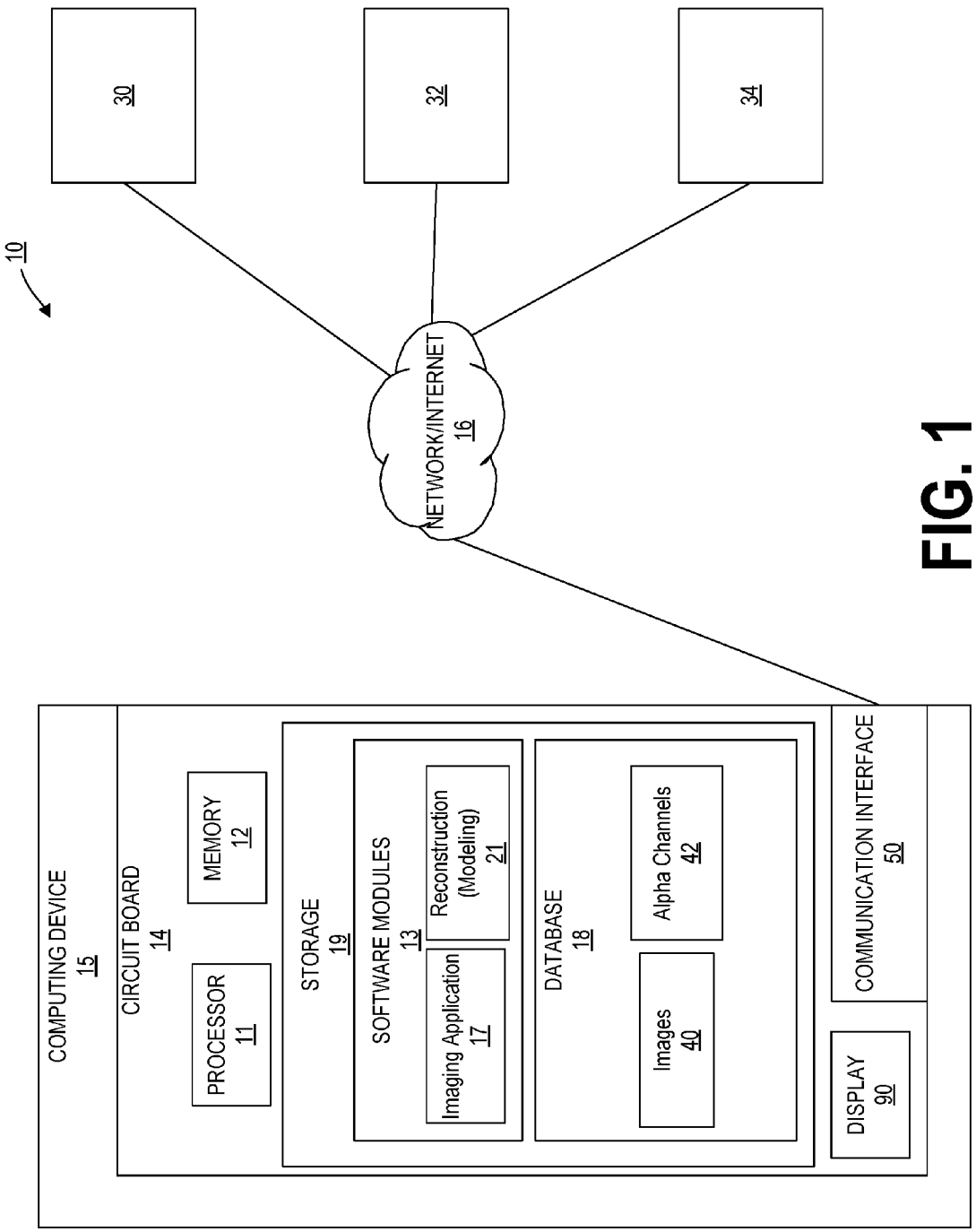
FIG. 1 is a schematic of an exemplary computer system incorporating the teachings of the present invention.

An exemplary computer system is shown as a block diagram in FIG. 1 which is a high-level diagram illustrating an exemplary configuration of a system 10 for creating a radial lenticular blending effect and in particular, for forming a merged radial effect file that is used to generate a lenticular print image that is part of a lenticular product. In one implementation, computing device 15 can be a personal computer or server. In other implementations, computing device 15 can be a tablet computer, a laptop computer, or a mobile device/smartphone, though it should be understood that computing device 15 of the present system 10 can be practically any computing device and/or data processing apparatus capable of embodying the systems and/or methods described herein.

Computing device 15 of the system 10 includes a circuit board 14, such as a motherboard, which is operatively connected to various hardware and software components that serve to enable operation of the lenticular imaging system 10. The circuit board 14 is operatively connected to a processor 11 and a memory 12. Processor 11 serves to execute instructions for software that can be loaded into memory 12. Processor 11 can be a number of processors, a multi-processor core, or some other type of processor, depending on the particular implementation. Further, processor 11 can be implemented using a number of heterogeneous processor systems in which a main processor is present with secondary processors on a single chip. As another illustrative example, processor 11 can be a symmetric multi-processor system containing multiple processors of the same type.

Preferably, memory 12 and/or storage 19 are accessible by processor 11, thereby enabling processor 11 to receive and execute instructions stored on memory 12 and/or on storage 19. Memory 12 can be, for example, a random access memory (RAM) or any other suitable volatile or non-volatile computer readable storage medium. In addition, memory 12 can be fixed or removable. Storage 19 can take various forms, depending on the particular implementation. For example, storage 19 can contain one or more components or devices such as a hard drive, a flash memory, a rewritable optical disk, a rewritable magnetic tape, or some combination of the above. Storage 19 also can be fixed or removable.

One or more software modules 13 are encoded in storage 190 and/or in memory 12. The software modules 13 can comprise one or more software programs or applications having computer program code or a set of instructions executed in processor 11. Such computer program code or instructions for carrying out operations for aspects of the systems and methods disclosed herein can be written in any combination of one or more programming languages, including an object oriented programming language such as Java, Smalltalk, C++, Python, and JavaScript or the like and conventional procedural programming languages, such as the "C" programming language or similar programming languages. The program code can execute entirely on computing device 15, partly on computing device 15, as a stand-alone software package, partly on computing device 15 and partly on a remote computer/device, or entirely on the remote computer/device or server. In the latter scenario, the remote computer can be connected to computing device 15 through any type of network, including a local area network (LAN) or a wide area network (WAN), or the connection can be made to an external computer (for example, through the Internet 16 using an Internet Service Provider).

One or more software modules 13, including program code/instructions, are located in a functional form on one or more computer readable storage devices (such as memory 12 and/or storage 19) that can be selectively removable. The software modules 13 can be loaded onto or transferred to computing device 15 for execution by processor 11. It can also be said that the program code of software modules 13 and one or more computer readable storage devices (such as memory 12 and/or storage 19) form a computer program product that can be manufactured and/or distributed in accordance with the present invention, as is known to those of ordinary skill in the art.

It should be understood that in some illustrative embodiments, one or more of software modules 13 can be downloaded over a network to storage 19 from another device or system via communication interface 15 for use within gemstone registration system 10. For instance, program code stored in a computer readable storage device in a server can be downloaded over a network from the server to gemstone registration system 10.

Preferably, included among the software modules 13 is a lenticular imaging application 17 that is executed by processor 11. During execution of the software modules 13, and specifically the lenticular imaging application 17, the processor 11 configures the circuit board 14 to perform various operations relating to product arrangement determination with computing device 15, as will be described in greater detail below. It should be understood that while software modules 13 and/or lenticular imaging application 17 can be embodied in any number of computer executable formats, in certain implementations software modules 13 and/or lenticular imaging application 17 comprise one or more applications that are configured to be executed at computing device 15 in conjunction with one or more applications or 'apps' executing at remote devices, such as computing device(s) 30, 32, and/or 34 and/or one or more viewers such as internet browsers and/or proprietary applications. Furthermore, in certain implementations, software modules 13 and/or lenticular imaging application 17 can be configured to execute at the request or selection of a user of one of computing devices 30, 32, and/or 34 (or any other such user having the ability to execute a program in relation to computing device 15, such as a network administrator), while in other implementations computing device 15 can be configured to automatically execute software modules 13 and/or lenticular imaging application 17, without requiring an affirmative request to execute. It should also be noted that while FIG. 1 depicts memory 12 oriented on circuit board 14, in an alternate arrangement, memory 12 can be operatively connected to the circuit board 14. In addition, it should be noted that other information and/or data relevant to the operation of the present systems and methods (such as database 18) can also be stored on storage 19, as will be discussed in greater detail below.

Also preferably stored on storage 19 is database 18. As will be described in greater detail below, database 18 contains and/or maintains various data items and elements that are utilized throughout the various operations of lenticular imaging system 10, including but not image files 40, blending instructions (alpha channel files) 42, etc., as will be described in greater detail herein. It should be noted that although database 18 is depicted as being configured locally to computing device 15, in certain implementations database 18 and/or various of the data elements stored therein can be located remotely (such as on a remote device or server—not shown) and connected to computing device 15 through network 16, in a manner known to those of ordinary skill in the art.

Communication interface 50 is also operatively connected to circuit board 14. Communication interface 50 can be any interface that enables communication between the computing device 15 and external devices, machines and/or elements. Preferably, communication interface 50 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting computing device 15 to other computing devices and/or communication networks such as private networks and the Internet. Such connections can include a wired connection or a wireless connection (e.g. using the 802.11 standard) though it should be understood that communication interface 50 can be practically any interface that enables communication to/from the circuit board 14.

In the description that follows, certain embodiments and/or arrangements are described with reference to acts and symbolic representations of operations that are performed by one or more devices, such as the lenticular imaging system 10 of FIG. 1. As such, it will be understood that such acts and operations, which are at times referred to as being computer-executed or computer-implemented, include the manipulation by processor 11 of electrical signals representing data in a structured form. This manipulation transforms the data and/or maintains them at locations in the memory system of the computer (such as memory 12 and/or storage 19), which reconfigures and/or otherwise alters the operation of the system in a manner understood by those skilled in the art. The data structures in which data are maintained are physical locations of the memory that have particular properties defined by the format of the data. However, while an embodiment is being described in the foregoing context, it is not meant to provide architectural limitations to the manner in which different embodiments can be implemented. The different illustrative embodiments can be implemented in a system including components in addition to or in place of those illustrated for the gemstone registration system 10. Other components shown in FIG. 1 can be varied from the illustrative examples shown. The different embodiments can be implemented using any hardware device or system capable of running program code. In another illustrative example, lenticular imaging system 10 can take the form of a hardware unit that has circuits that are manufactured or configured for a particular use. This type of hardware can perform operations without needing program code to be loaded into a memory from a computer readable storage device to be configured to perform the operations.

For example, computing device 15 can take the form of a circuit system, an application specific integrated circuit (ASIC), a programmable logic device, or some other suitable type of hardware configured to perform a number of operations. With a programmable logic device, the device is configured to perform the number of operations. The device can be reconfigured at a later time or can be permanently configured to perform the number of operations. Examples of programmable logic devices include, for example, a programmable logic array, programmable array logic, a field programmable logic array, a field programmable gate array, and other suitable hardware devices. With this type of implementation, software modules 13 can be omitted because the processes for the different embodiments are implemented in a hardware unit.

In still another illustrative example, computing device 15 can be implemented using a combination of processors found in computers and hardware units. Processor 11 can have a number of hardware units and a number of processors that are configured to execute software modules 13. In this example, some of the processors can be implemented in the number of hardware units, while other processors can be implemented in the number of processors.

In another example, a bus system can be implemented and can be comprised of one or more buses, such as a system bus or an input/output bus. Of course, the bus system can be implemented using any suitable type of architecture that provides for a transfer of data between different components or devices attached to the bus system. Additionally, communications interface 50 can include one or more devices used to transmit and receive data, such as a modem or a network adapter.

Embodiments and/or arrangements can be described in a general context of computer-executable instructions, such as program modules, being executed by a computer. Generally, program modules include routines, programs, objects, components, data structures, etc., that perform particular tasks or implement particular abstract data types.

It should be further understood that while the various computing devices and machines referenced herein, including but not limited to computing device 15, computing devices 30, 32, and 34 are referred to herein as individual/single devices and/or machines, in certain implementations the referenced devices and machines, and their associated and/or accompanying operations, features, and/or functionalities can be arranged or otherwise employed across any number of devices and/or machines, such as over a network connection, as is known to those of skill in the art.

It is to be understood that like numerals in the drawings represent like elements through the several figures, and that not all components and/or steps described and illustrated with reference to the figures are required for all embodiments or arrangements. It should also be understood that the embodiments, implementations, and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described herein. It should be appreciated that according to at least one embodiment, one or more computer programs, modules, and/or applications that when executed perform methods of the present invention need not reside on a single computer or processor, but can be distributed in a modular fashion amongst a number of different computers or processors to implement various aspects of the systems and methods disclosed herein.

Thus, illustrative embodiments and arrangements of the present systems and methods provide a computer implemented method, computer system, and computer program product for determining product arrangements. The block diagram in the figures illustrates the architecture, functionality, and operation of possible implementations of systems, methods and computer program products according to various embodiments and arrangements. In this regard, each block in the block diagram can represent a module, segment, or portion of code, which comprises one or more executable instructions for implementing the specified logical function(s). It should also be noted that, in some alternative implementations, the functions noted in the block may occur out of the order noted in the figure. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Turning now to one exemplary embodiment of the invention, two images are chosen to be integrated into a lenticular image using the system 10. The images need not be restricted to any particular content to make use of the invention. They may, for example, be drawings or renderings made by manual or synthetic means, as long as the materials can reasonably be made amenable to the invention.

The given example is intended for use with a lenticular lens material that is oriented such that the lenses run horizontally. Handheld animations take this form, while fixedly mounted animations use vertically disposed lenses, so that the transition is visible as the observer passes by. The invention is intended to include both implementations.

The following example describes an interlaced lenticular image that is derived from two scenes and an alpha channel. An alpha channel is expressed through a visual interface as a grayscale image, but serves computationally to selectively divide the contribution of two images on a pixel-by-pixel basis. The nominal grayscale value of each pixel in an alpha channel indicates the computational partition, with a 50% gray representing an even contribution from each image.

Figure 3:
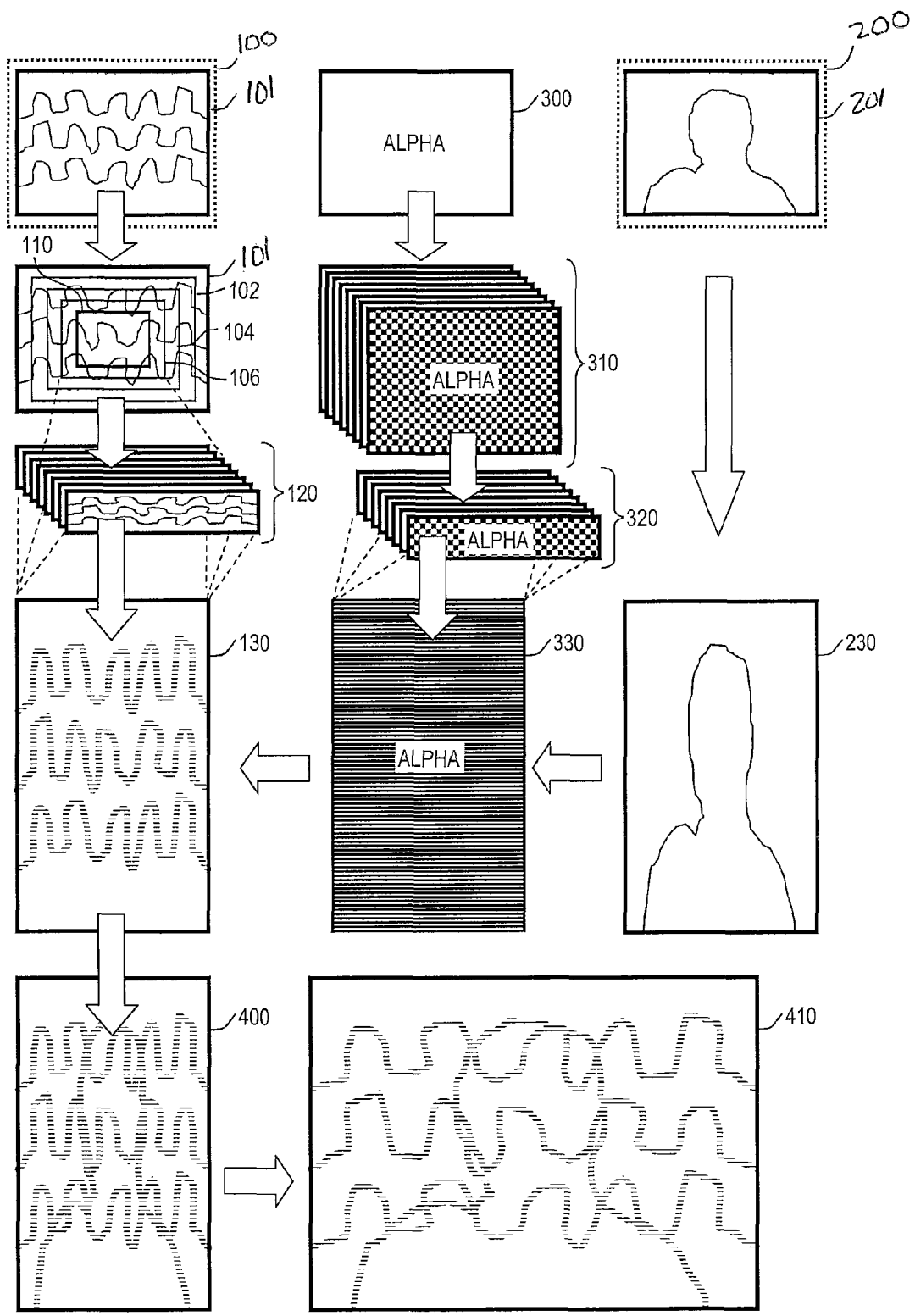
FIG. 3 is a schematic flow chart showing the major operations in an embodiment prepared in accordance with the invention.

Referring now to the flow chart of FIG. 3, first image 100 is exemplified by a group photograph. A group photograph may include any number of individuals, who may be posed in various ways compatible with the practice of the art. Second image 200 is exemplified here by a photograph of an individual subject. The second image may be more broadly imagined to be any sort of image, including but not limited to a subset of the collection of individuals in the first image. The dotted line indicates that these files represent the original source medium, regardless of the type.

It should again be emphasized that the invention is effective without strict requirements concerning the relationship between the two contributing images. For example, a first image might show a graduating class, while the second might show one of those graduates along with friends or family who were not captured in the group photograph. An athlete might have been absent from a team photo, but may have been available for the session in which individual portraits were captured. Neither of the preceding situations entails the subjects of the second image being a subset of the subjects of the first, but both circumstances are regularly encountered in practice.

Returning to FIG. 3, first image 100 and second image 200 may then be scanned, cropped and resampled as required so that they are matched in resolution, aspect ratio, and nominal dimension and stored as compatible digital data. Changes may also be made to the file type, the dynamic range, the color profile or other properties to render the two files technically or visually aligned with the subsequent process. The collective result of these steps is correlated first image 101 and correlated second image 201, indicated by the solid rectangular perimeters.

Correlated first image 101 is subsequently used as a source file for producing a zoom image. In the invention, the zoomed area does not need to target a particular subject, but may have its center at any point within the more comprehensive image.

FIG. 3 shows targeted zoom area 110, here selected to be about one-third of the width of Correlated first image 100 and chosen to be centered on the larger image. The targeted area shown inherits the aspect-ratio of the parent correlated first image 101. Intermediate scaling frames 102, 104, and 106 are indicated by rectangles of lighter line weight.

While three are shown, the number of intermediate scaling frames is elective, and would often in practice be greater.

During a later interlacing step, multiple images are rendered into an interlaced file at the output resolution of a chosen printing device. In a practice that is well understood in the trade, the printer's output resolution and the lens pitch define the number of lines of image data that can be located behind a single lens.

The number of scaling frames can be chosen in mind of this value. In the simple case where the number of lines associated with each lens is an integer value, the intermediate frames can correspond to individual lines of printed data over which the transition occurs.

Ultimately, each lenticular lens will be associated with a given lens field. In the practice of the present invention, it has been found that it is often advantageous to limit the contributory zoom effect roughly to the central third of lens field. The two margins of the lens field are assigned to the stable expression of the two terminal images.

The number of intermediate frames elected may be informed by these understandings. For example, if the chosen printer produces exactly 18 lines per lens, six lines might be assigned to the original "zoomed out" image, six to the "zoomed in" image, and six to the intermediate scaled transitions. Integer values such as these are normally only attainable when the resolution of the elected output device is freely adjustable. In this case, eight files would need to be available for the interlacing, with the first and last files repeatedly accessed.

In the case where the lens pitch and the resolution of the output device are both fixed, the image may be resampled to match the lens pitch. As the number of views may then include a fractional value, it may readily be understood that it is not necessary to match the number of intermediate scaled views to the printer output. When the number of views dedicated to each lens is a non-integer value, the interlacing process resorts to a resampling of the composite image to reconcile the interlaced data with a targeted output resolution.

Irrespective of the system used, if the number of scaled views is less than the number of lines to which it is assigned, the interlacing step renders the views to more than one line of data. If the number of scaled views provided exceeds the available output resolution, plural views will be blended within each rendered line within the interlaced image.

In the case of a zoom image, these results do not corrupt or disable the zoom effect, but merely provide different transitional effects. Nevertheless, while such impressions are somewhat subjective, it has been found that an approximate match between the number of intermediate scaled frames and the number of lines available at the output resolution results in a zoom effect that is visually fluid, but which does not impart an undue processing burden. In practice this commonly entails the generation of five to ten intermediate scaled images.

In the process of generating a zoom image, the coordinates of the intermediate scaling frames may be established by taking the dimensional difference between the full image and the target area, then dividing the intervening margin by i+1, where i is the elected number of intermediate scaling frames, and adding those values progressively to the coordinates of the target area. This method results in a regular linear cropping sequence.

These designated regions may electively be upsampled to the same raster resolution as the two terminal frames. However, since the series of images is typically downsampled in the cross-lens axis in the interlacing operation, unnecessary information losses may be avoided by rendering the selected areas directly to this anamorphic format, as exemplified by the dotted lines leading to pre-interlacing file queue 120.

Generally speaking, owing to the axially biased optical effect of the lenses, it is often most efficient to render, resample, or store certain phases of the imaging process anamorphically. This practice may be applied not only in the scaling of the target area and the intermediate views. It may be considered unnecessary to resample any image, in the axis of relevance, to a resolution that exceeds the number of lenses that will be present in the physical lenticular image.

By way of a simplified example, if the pitch of the lenses is 75 lenses per inch, and the output device is capable of 1200 dots per inch (dpi), sixteen views can be available to each lens. However, the resolution in the axis that parallels the lenses may not need to exceed 300 dots per inch. In this case, the interlaced file can be efficiently rendered to a resolution of 300×1200 pixels per inch (ppi). By implication, each of the sixteen views that contribute to that image need only encompass a resolution of 300×75 ppi. This circumstance implies an anamorphic ratio of 4:1, but that exact value represents this idealized case.

Returning now to the set of suitable anamorphic images in the pre-intelarcing file queue, it may be appreciated that this file set can be intermittently addressed on a line-by-line basis to progressively compose an interlaced file. This process is indicated by the conversion of pre-intelarcing file queue 120 into interlaced first image file 130. The resulting interlaced file may electively also be generated at anamorphic file, for example have an approximate 4:1 ratio. An elongate proportion is suggested by the vertical expansion of interlaced first image file 130.

This preceding description of generating a zoom effect is schematic and is included here in the interest of enablement and thoroughness of description. It may be imagined that there are many variations in the process of generating and reproducing a zoom effect, and that there are diverse mechanisms in lenticular imaging for reducing processing time and minimizing file size.

Particularly, in, the illustrations and descriptions in the service of the disclosing procedures of the invention should not be taken at any stage to exclusively require proportional, i.e., non-anamorphic, resolution, as such a quality is only required upon output.

Lenticular images formed according to the present invention combine a preestablished zoom effect with a second effect that proceeds in a similar radial manner. The process typically first generates a zoom image from standard coordinates that are embedded in the software that generates the zoom imagery.

In accordance with the present invention a blending function is employed which determines the degree of contribution of the second image with respect to the first image. It will be appreciated that the blending function can be part of a software program that allows the blending of two images (the first and second images) by a pixel by pixel basis and according to a predetermined ratio. In other words, the blending function employed in the present invention controls the degree (level) of visibility of the second image relative to the first image. In this manner, as the lenticular product is manipulated, the second image progressively becomes more visible in accordance with the blending function. The blending function can thus be thought to include and driven by a set of blending instructions for each pixel and in the form of a lenticular product, such as the present invention, the blending instructions are integrated into the formation of an interlaced print image that is used in the lenticular product.

In one embodiment, the blending function employed in the imaging process of the present invention is an alpha channel based system. However, it will be appreciated that a software application can be employed to construct a predetermined blending function in which the degree of visibility of the second image relative to the first image is programmed on a pixel by pixel basis so as to create a final interlaced blended image (file) that serves as the basis for the interlaced print image layer that is part of the lenticular product.

Alpha channels are masks through which you can display images. The alpha channel can be an 8-bit channel, which means it has 256 levels of gray from 0 (black) to 255 (white). White acts as the visible area; black acts as the transparent area (you see the background behind the image when displayed). The level of gray in between determines the level of visibility. For example, 50 percent gray allows for 50 percent visibility. Alpha channels are usually used with 16.8M color RGB images. The resulting image is called RGBA (RGB+A, A means alpha channel). An alpha channel is thus an additional channel that can be added to an image that contains information (such as transparency information) about the image and depending upon the type of alpha it can contact various levels of transparency (as discussed herein). The alpha channel (image blending software) essentially controls the transparency of all of the other channels. Various alpha channels include but are not limited to pre-multiplied alpha and straight alpha.

The blending function can thus be thought of as providing blending instructions which can be expressed as blending values (colors) for each pixel. Alpha blending is thus a combination of two colors allowing for transparency effects in computer graphics which in turn allows the print image to be formed and printed.

The use and role of the blending function is described below.

The second image, which will be viewed as a still phase in the final image, is then applied through a specialized alpha channel so that it becomes an inseparable part of a single image file. While the second image is not interlaced, it is expressed through an alpha channel which has been interlaced at the same spatial frequency as the zoom effect. In this way, the eventual visual emergence of the second image is integrated with the interlaced zoom image structure.

Referring now to the central column in FIG. 3, the first box is marked "ALPHA" to denote that this file is not a visual image but a masking tool comprising a single data channel. The alpha channel development process will ultimately result a file that is interlaced at the same pitch as the zoom image. The series of files that contribute to the construction of the interlaced alpha channel are represented by alpha file set 310. The alpha file set is depicted more descriptively in FIG. 4. It may be observed in FIG. 4 that there is a deliberate progression in the alpha file set.

This may be attained by using interlacing software with a set of grayscale images serving as the source images. In the invention, the grayscale source images are produced as a series, each successive frame ultimately contributing a specific and progressive transition. The transition is consistent with the visual rationale of the invention.

In viewed images made in accordance with the invention, the second image takes the place of the "zoomed in" version of image, in that it provides the second, relatively stable terminal phase of the viewed image. The alpha channel must therefore be conscientiously devised so that the second image overtakes the zooming effect before it becomes obvious that the zoom is centered on an arbitrary location in the image.

Therefore, like the zoom effect previously described, the alpha channel must promote the transition in the central phase of the angular field. In practice, the zoom effect and the radial fade-in therefore typically occur within the same lines of pixels. For example, in the previously cited case in which each lens is associated with 18 lines of image data, the fade-in and the partial zoom might be made to occur within the same six central lines.

The zoom effect begins as a series of images of increasingly magnified scale. In the invention, at the moment this zoom effect is initiated, a secondary transitional effect is introduced at the center of the zoom. The secondary transition effect eventually fully overtakes the zoom effect and exposes the second image unambiguously to view.

It has furthermore been discovered in the practice of the invention that the secondary effect is particularly effective and consistently complementary to the partial zoom effect when the initial introduction of the second image is relatively indistinct in its boundaries, but becomes increasingly distinct as the second image is seen to approach the image perimeter. This progression can be controlled by the conscientious editing of the gradients within the series of images that contribute to the interlaced alpha channel.

More specifically, the sequence of grayscale images proceeds from a relatively gradual transitional boundary gradient to a relatively abrupt boundary gradient. Such a series may be generated by various means in an image editing program. For example, the grayscale patterns may be made using a gradient tool with predetermined set points.

Set points may include the starting and ending grayscale values, the gradient length, and the progression of the rate of change in value. Alternately, the gradient series may be made using selection and blurring tools. The gradient files may also be directly defined by numerical values and image coordinates.

Figure 4:
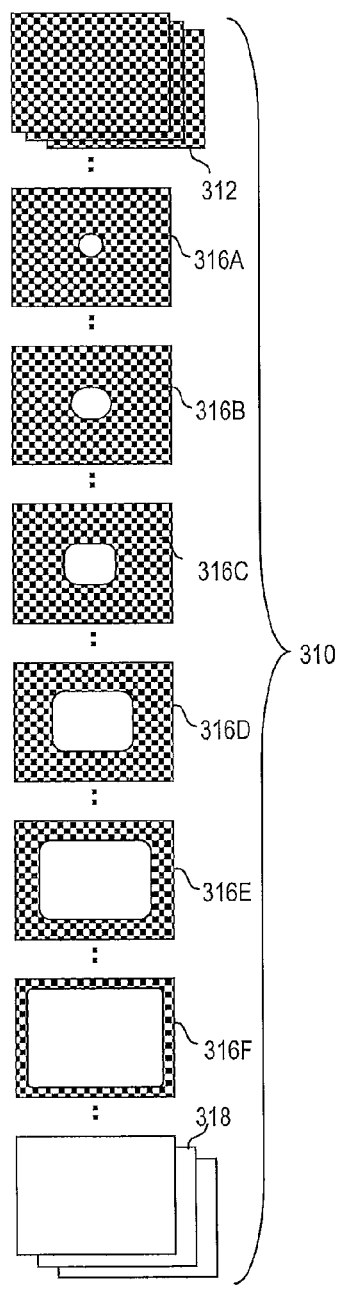
FIG. 4 is a schematic diagram of a series of files that contribute to an interlaced alpha channel.

These properties may be imagined in reference to FIG. 4, although neither solid black nor grayscale gradients can be directly illustrated. The checkered pattern here represents solid black in the normal graphic expression of the alpha channel. Black file set 312 includes a repetition of files generating entirely black pixel values. First alpha transition file 316A represents the first departure from an all-black file state. The encircled white area need not attain a white value even at its lightest pixel, and may electively have a peak brightness at its center of 25% white or less.

Final alpha transition file 316F shows the white area nearly overtaking the entire rectangular image area. Intermediate alpha transition files 316B, 316C, 316D, and 316E depict a progression between the first and final transition files.

The contour of the selected area (shown here as white) need not remain the same throughout the transition. For example, as exemplified in FIG. 4, the initial frame of the alpha series may be a circular radial gradient that progresses through a increasingly rectangular phases until it substantially attains the aspect ratio of the finished image. It may be appreciated that this file set is freely editable. In addition to simple geometric variations, it may also have, at one state or throughout the transition, a stellate or irregular contour.

Regardless or the set of gradients chosen, it is generally advantageous in the invention to prepare the alpha series so that the introduction of the second image is initiated in the same vicinity where the zoom target area is centered. This location may be by default the measured center of the image, but may foreseeably be placed at another locale if circumstances demand.

The alpha series is concluded with a set of nominally white frames 318. As noted here, these pictures should be understood simply as convenient expressions of computational values. While three outlines are shown for the purpose of illustration, the black and white places in the queue may each equal the number of transitional frames, anticipating the even partition of the viewed angular field angular between the first image, the mixed zoom/fade transition, and the second image.

Returning now to the flow chart of FIG. 3, the alpha file set 310 is shown being processed to form alpha file queue 320. A rationale for archiving an alpha file set at normal resolution is that the file set may be accessed and converted into a suitable interlacing queue of anamorphic images for any size, aspect ratio, or lens orientation.

Alpha file queue 320 is then interlaced as required to correspond to in frequency of the prior zoom image. This process results in an interlaced alpha channel 330, which in the illustrated case shares the anamorphic proportions of interlaced first image file 130.

Correlated second image 200, which is exemplified by the image of an individual subject, is then resampled to form resampled second image 230 in order to match the proportions of the interlaced image and the interlaced alpha channel. The alpha channel is then used as a selection mask to integrate the interlaced zoom image and the static second image.

The result of this combination is merged radial effect file 400, which at this point is kept in anamorphic state. Prior to output to a printing device calling for symmetrical resolution, the file may be expanded to normal proportions, as represented by proportional radial effect file 410.

It may be appreciated that printers often receive streaming data, so that the proportional file may not always be embodied as a digital record, but may result in the conscientious repetition of line data from an anamorphic file source. In any case, the eventual printed image should, by whatever means, be rendered to its intended proportions.

Figure 5:
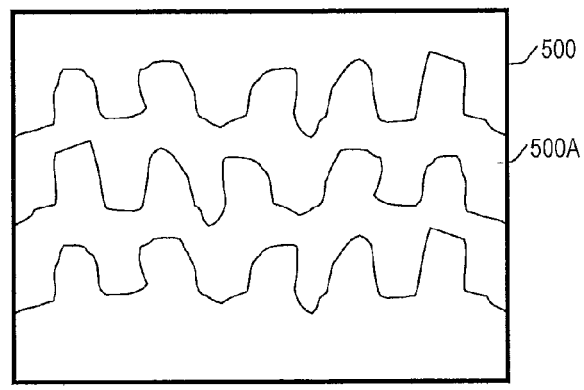
FIG. 5 show a lenticular print in a first viewing phase in which the visible subject is a group.
Figure 6:
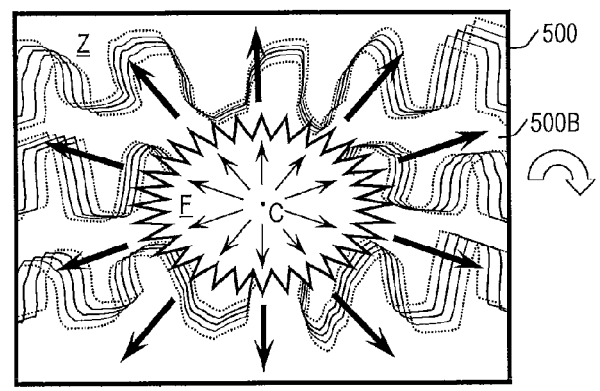
FIG. 6 shows the lenticular print of FIG. 5 in a second phase, the second phase being state of transition, showing the complementary radial effects of the zoom effect and the radial fade effect.
Figure 7:
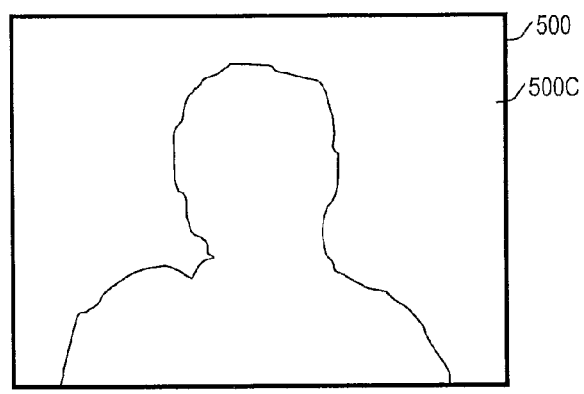
FIG. 7 shows the lenticular print of FIG. 5 in a third phase in which the visible subject is an individual.

FIGS. 5 through 7 inclusive illustrate the behavior of observed lenticular image 500 as it is rotated through its relevant angular range. The rotation is indicated by the curved arrow, but in practice may be in either direction, depending upon the manner of composition of the image.

While the lenticular lenses are left out of the drawing for the sake of clarity of illustration, lenses in this exemplary case would be present and would run horizontally. FIG. 5 shows first observed state 500A in which the first picture of a group is displayed. FIG. 7 shows the third observed state 500C in which the second picture of an individual subject is displayed.

FIG. 6 describes observed transition 500B between the two states. As noted before, the transition includes two separate but complementary radial effects. Here the radial effects share a geometrical center C. It may be appreciated that while the two effects occur concurrently, the initiation of the radial fade may be relatively subtle owing to management of the alpha channel sequence previously described.

Typically the observer would at first notice the dominant zooming effect, represented by the region marked Z. However, owing to the particular progression in the alpha series and expressed through the interlaced alpha channel, the static second image would be progressively revealed. The grayscale gradients in the alpha channels produce a vignetted effect. This vignetted transition boundary cannot be directly shown, but is suggested here by the stellate outline of fade region F.

The bold areas indicate the radial expansion of the zoom, while the lighter arrows indicate the radial transition of the area fading in. The direction of the effect in both reverses if the image is tilted in the opposite direction.

As noted before, if the lenticular print has been formed according to the preceding teachings of the invention, the fade effect will expands and overtake the area occupied by the zoom. The invention therefore provides a product which has the visual appeal of zoomed lenticular image, but resolves limitations of both technology and professional convention in the photographic trade.

In one aspect of the present invention, the present invention can be incorporated into systems that are described in Applicant's prior patent application including but not limited to U.S. patent application Ser. No. 13/181,954, and U.S. patent application Ser. No. 61/413,421, each of which is hereby incorporated by reference in its entirety.

More particularly, the proportional radial effect (image) file 410 is used to form the interlaced print image layer (such as layer 96) that is combined with a lenticular lens sheet 92 to form a lenticular product, such as product 90.

Based on the foregoing, it will be appreciated that aspects of the present invention can be a lineated printed image for use in cooperation with a lenticular lens material. The lenticular lens has a predetermined lens pitch. The printed image includes a plurality of lens fields substantially equal in pitch to the predetermined lens pitch. Each of the lens fields includes a plurality of lines of sufficient frequency to provide differing graphic information across the width of each lens field within the lineated printed image. The lineated printed image represents graphic data from three image phases, each of the three image phases being associated with a portion of printed matter. Each of the portions is respectively derived from digital graphic data from one of the three image phases.

Each of the portions of printed matter comprises a collection of fractional lens fields. Each of the collections extends at least partly across the lineated printed image. The lineated printed image therefore includes a first portion, a second portion, and a third portion, wherein the first portion of printed matter incorporates visual data from a first image, the second portion of printed matter incorporates visual data from said first image and a second image, and the third portion of printed matter incorporates visual data from said second image. The second portion of printed matter provides within each of at least a subset of lens fields a continuous graphical transition between the first portion of printed matter and the third portion of printed matter. Wherein the second portion of printed matter additionally includes printed matter derived from a first image so that the printed matter derived from the first image includes printed matter derived from the subject matter of the first image rendered at differing scales. The second portion of printed matter additionally includes printed matter derived from the second image.

Wherein the continuous graphical transition occurs within the lens fields, about an elected location, and across the lineated printed image, such that when the lenticular lens material of the predetermined pitch is disposed upon the lineated printed image and compatibly aligned, a changeable radial effect is provided that allows viewing of both an apparent progression in scale in the subject matter of the first image and a coincident radial progression in the visible area of the subject matter of the second image.

Other features of the lineated printed image include by are not limited to: 1) the apparent progression in scale in the subject matter of the first image constitutes a zoom effect to a target zoom area that constitutes a portion of the first image less than the entire first image; (2) common elements of the subject matter of the first image are shifted during the zoom in the same radial direction as the radial progression in the visible area of the subject matter of the second image; (3) transition between the first portion of printed matter and the third portion of printed matter occurs in a gradient within each of a subset of lens fields; (4) the subset of lens fields provides a continuous graphical transition in a preponderance of lens fields; (5) the lens can be adhered to print; and (6) the lens cannot adhered to print, relative motion between.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. A method of forming a lenticular product having a radial lenticular blending effect comprising the steps of:
   selecting a first image and a second image;
   processing the first image and the second image to form a correlated first image and a correlated second image, respectively, wherein the correlated first image represents a source file for producing a zoom image;
   selecting a targeted zoom area within the correlated first image and forming an interlaced first image which comprises an interlaced zoom image having a zoom effect that is observed in the targeted zoom area;
   forming an interlaced alpha channel made up of an alpha file queue that is formed from an alpha file set, wherein the interlaced alpha channel is interlaced at a same spatial frequency as the zoom effect generated by the interlaced zoom image;
   using the interlaced alpha channel as a selection mask to integrate the interlaced zoom image and the second image which comprises a non-interlaced, static image to form a merged radial effect file, wherein the interlaced alpha channel as a selection mask includes a variable level of transparency;
   producing an interlaced print image layer based on the merged radial effect file; and
   combining the interlaced print image layer with a lenticular lens to form the lenticular product.

2. The method of claim 1, wherein the lenticular product transitions from a first observed state in which the first image is displayed to a second observed state in which the static second image is observed.

3. The method of claim 1, wherein the transition from the first observed state to the second observed state includes two separate but complementary radial effects that share a common center.

4. The method of claim 3, wherein the common center comprises a common geometric center.

5. The method of claim 1, wherein the alpha channel is configured so as to progressively reveal the static second image as the lenticular product transitions from the first observed state to the second observed state.

6. The method of claim 1, wherein the alpha file set comprises a sequence of gray scale images that proceed from a gradual transitional boundary gradient to an abrupt boundary gradient.

7. The method of claim 1, wherein the zoom effect and the alpha channel share a common center.

8. The method of claim 1, wherein the interlaced alpha channel is configured such that the visual emergence of the static second image is integrated with a structure of the interlaced zoom image.

9. The method of claim 1, wherein the static second image, which is viewed as a still phase in a final image after the lenticular transition is complete, is an inseparable part of the merged radial effect file as a result of being applied the interlaced alpha channel which is constructed to be specific to the second image.

10. The method of claim 1, wherein the zoom area represents a discrete area of the first image and thus can have a center at any point within the first image.

11. The method of claim 1, wherein the interlaced alpha channel is configured such that the second image constitutes a zoomed-in image that is observed in the zoom area of the first image, the second image representing a stable terminal phase of the lenticular product as a result of the second image being a static image.

12. The method of claim 1, wherein the interlaced alpha channel is constructed such that an introduction of the second image is initiated in a same vicinity where the target zoom area is centered.

13. The method of claim 1, wherein the static second image, which is viewed as a still phase in a final image after the lenticular transition is complete, is an inseparable part of the merged radial effect file as a result of being applied the interlaced alpha channel which is constructed to be specific to the second image.

14. The method of claim 1, wherein the zoom area represents a discrete area of the first image and thus can have a center at any point within the first image.

15. The method of claim 1, wherein the interlaced alpha channel is configured such that the second image constitutes a zoomed-in image that is observed in the zoom area of the first image, the second image representing a stable terminal phase of the lenticular product as a result of the second image being a static image.

16. The method of claim 1, wherein the interlaced alpha channel is constructed such that an introduction of the second image is initiated in a same vicinity where the target zoom area is centered.

17. A method of integrating a radial zoom effect with a complementary radial image transition effect to produce an integrated radial effect that can be used for producing an interlaced print image for use in a lenticular product comprising the steps of:

selecting a first image and a static second image;

processing the first image and the second image to form a correlated first image and a correlated second image, respectively, wherein the correlated first image represents a source file for producing a zoom image;

selecting a targeted zoom area within the correlated first image and forming an interlaced first image which comprises an interlaced zoom image having a zoom effect that is observed in the targeted zoom area;

forming an interlaced alpha channel made up of an alpha file queue that is formed from an alpha file set, wherein the interlaced alpha channel is interlaced at a same spatial frequency as the zoom effect generated by the interlaced zoom image; and using the interlaced alpha channel as a selection mask to integrate the interlaced zoom image and the second image which comprises a non-interlaced, static image to form a merged radial effect file for use in producing the interlaced print image, wherein the interlaced alpha channel as a selection mask includes a variable level of transparency, wherein the integrated radial zoom effect and the radial image transition effect share a common center and thereby share common displacement paths during a perceived transition between a first observed state in which the first image is displayed to a second observed state in which the static second image is observed.

18. The method of claim 17, wherein the alpha channel is configured so as to progressively reveal the static second image during the transition from the first observed state to the second observed state.

19. The method of claim 17, wherein the alpha file set comprises a sequence of gray scale images that proceed from a gradual transitional boundary gradient to an abrupt boundary gradient.

20. The method of claim 17, wherein the interlaced alpha channel is configured such that the visual emergence of the static second image is integrated with a structure of the interlaced zoom image.

* * * * *